March 31, 1942.  F. W. GUIBERT ET AL  2,277,700
COMPENSATING INDICATOR
Filed May 1, 1940   3 Sheets-Sheet 1
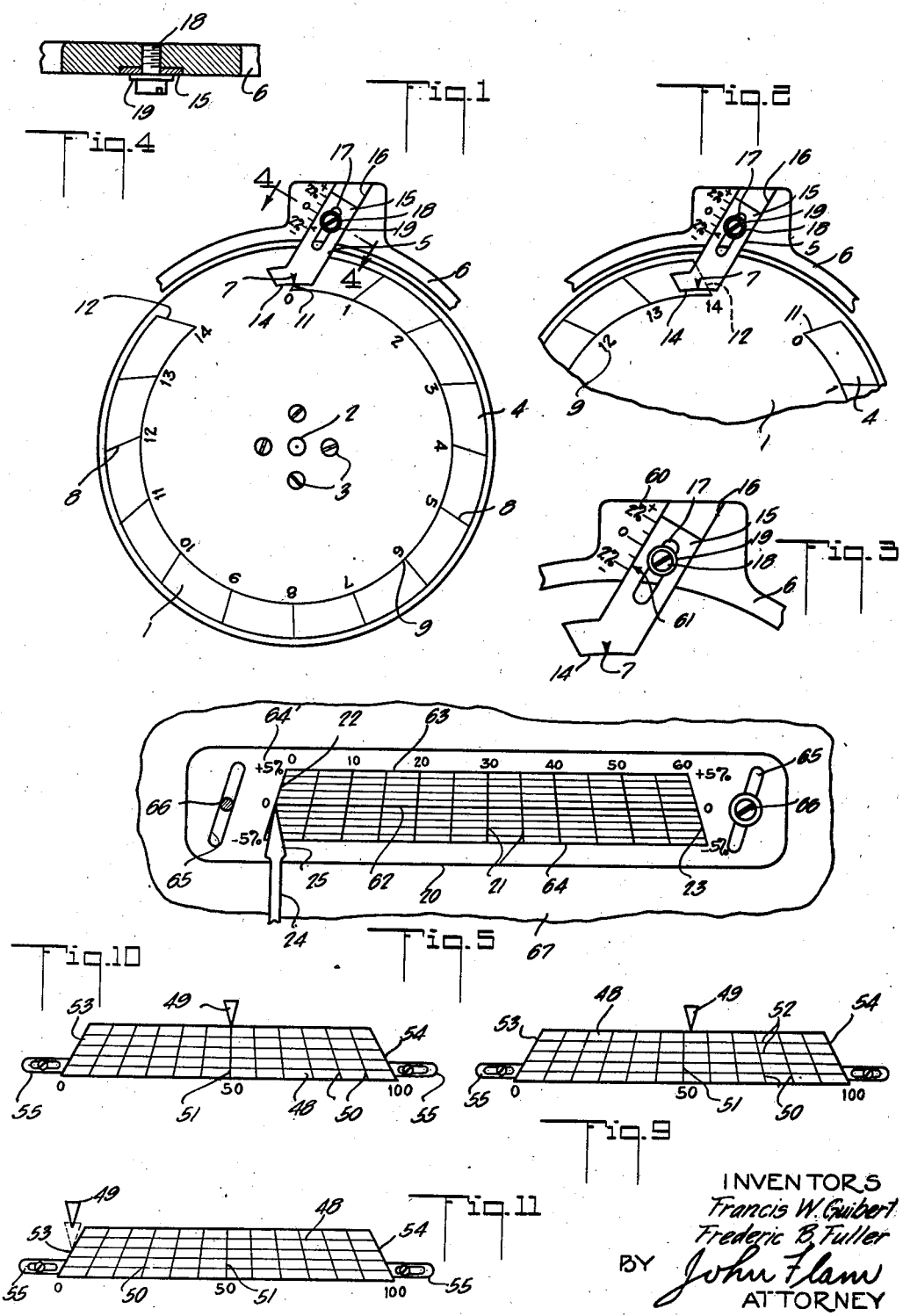
INVENTORS
Francis W. Guibert
Frederic B. Fuller
BY John Flann
ATTORNEY

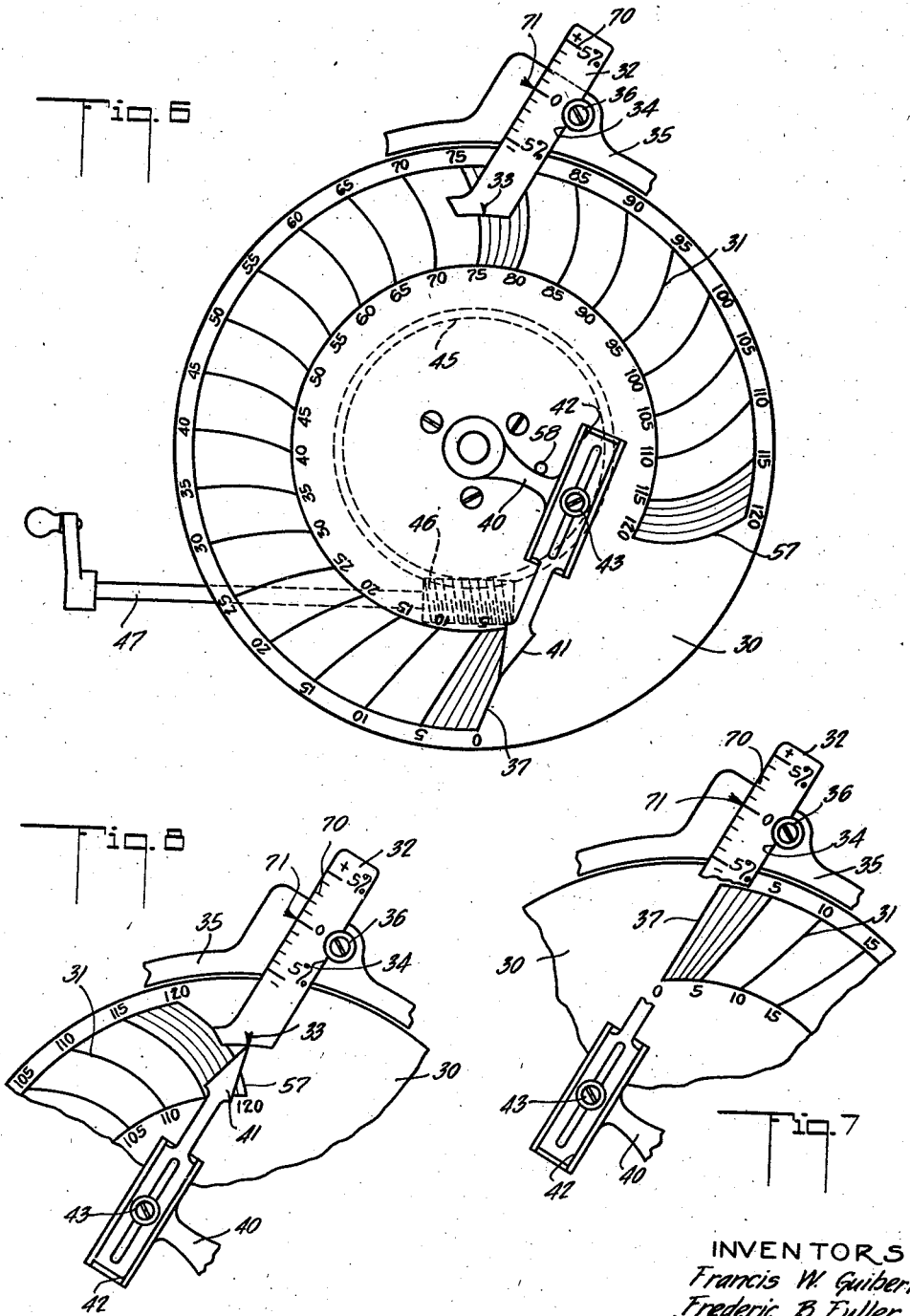

March 31, 1942. F. W. GUIBERT ET AL 2,277,700
COMPENSATING INDICATOR
Filed May 1, 1940 3 Sheets-Sheet 3
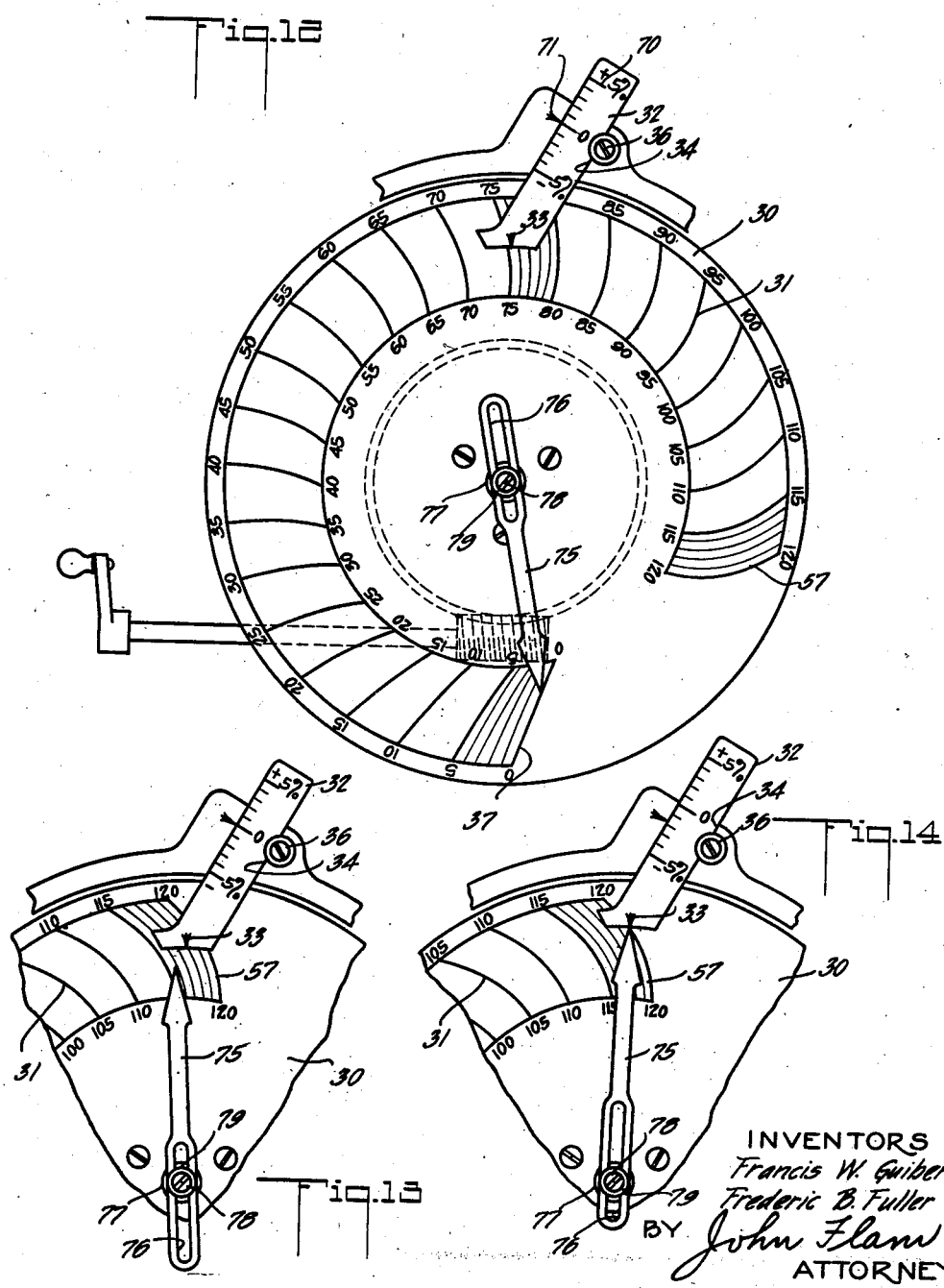
INVENTORS
Francis W. Guibert
Frederic B. Fuller
BY John Flann
ATTORNEY Patented Mar. 31, 1942

2,277,700

UNITED STATES PATENT OFFICE 2,277,700

COMPENSATING INDICATOR

Francis W. Guibert, Beverly Hills, and Frederic B. Fuller, Whittier, Calif.; said Fuller assignor to said Guibert Application May 1, 1940, Serial No. 332,766

7 Claims. (Cl. 116—129)

This invention relates to indicator mechanisms, and especially to a scale and pointer mechanism in which either the scale or pointer moves in accordance with the quantity indicated. Such mechanism may be used with a wide variety of apparatus, for example, electrical measuring instruments, chronometers, weighing devices, metering devices for gases or liquids, temperature indicators, pressure gauges, etc.

In the manufacture of such devices, it is frequently necessary to apply corrections to, or to calibrate, the indications, to bring the indicated quantity into harmony with the true or metered quantity. Especially is this true when such devices are manufactured in quantity by machinery. Although the scales are readily made substantially identical, to provide a sufficiently close tolerance for the rest of the device so that its measuring function will closely agree with the scale is often difficult and may be prohibitive from the standpoint of cost. Further, due to wear or other conditions incident to use, the amount or percent of difference needed for correction may change.

Further, in using such devices, it is often desirable to be able to apply a known percentage of correction to the indicated readings. In this way, it is possible to make measurements under existing or known conditions and to so translate the readings that the measurements will be as if the indicated quantities had been measured under other desired conditions, such as a predetermined or fixed standard of temperature, specific gravity or the like.

For example, in supplying water to a concrete mixer, it is desirable to hold the quantity delivered within close limits. Thus, the specifications may call for, as an example, twenty gallons at 70° temperature. It might be difficult or even impossible to ensure that the water passing a meter was at this temperature, and accordingly too much or too little water might be delivered. However, the temperature of the water can be readily determined and the amount by which a given quantity at the observed temperature differs from the same quantity at the standard temperature of 70° may be readily computed. The meter can then be calibrated in accordance with this difference, so that the indicated quantity will be the desired quantity when its temperature reaches 70°.

Similarly, corrections can be made for variations in specific gravity, or viscosity. Thus, in the oil industry, it may be desired to meter different kinds of oil, differing in specific gravity as well as temperature, these measurements referring to a common standard. By consulting a chart which could be constructed readily from suitable tests and calculations, it would be seen for instance, that one of the kinds of oil at an observed temperature of say 100 degrees requires a correction of minus three per cent. By calibrating the meter accordingly, when the meter indicates that a quantity of 50 gallons for example has been delivered, such a quantity of oil will have been delivered as will be exactly 50 gallons when the temperature of the oil has reached some standard, such as 60 degrees.

It is an object of this invention to provide an indicator having improved means of calibration.

In applications filed in the names of Francis W. Guibert and Frederic B. Fuller, on February 20, 1939, Serial No. 257,318, entitled "Indicating mechanism," and on August 14, 1939, Serial No. 290,008, entitled "Indicating device," indicating devices are described in which corrections in the scale readings may be accomplished by adjustment of the relative positions of the pointer and scale. Briefly, those devices incorporate a scale having scale marks and a pointer relatively movable transversely to the marks, in accordance with the measured quantity. The path traversed by the index end of the pointer during the measuring or indicating operation intersects the scale marks. By varying the length of the pointer or by bodily moving the scale with respect to the pointer, this transverse path may be adjusted to intersect the scale marks at any desired points along their lengths. Accordingly by appropriate design of the direction or slope of the index lines, the indicated quantities differ and are functions of the particular transverse path chosen.

While such an arrangement seems entirely satisfactory, the steps needed for calibration may entail some complications. The calibration is most conveniently based upon the use of the indicator in connection with an accurately predetermined quantity; and the scale and pointer must be so adjusted when the device is intended to indicate this quantity, that the indication is accurate both at the zero point and at the predetermined quantity indication. Thus the calibration may involve successive adjustment of the positions of both the scale and the pointer to effect this result. It is another object of this invention to simplify the calibration, by making it necessary to adjust but one of the indicator elements.

It is still another object of this invention to provide a novel scale and pointer which cooperate in such a way as to greatly simplify the operation of calibration.

It is a still further object of this invention to provide a scale and pointer which are relatively movable for the purposes of calibration and carry indicia which cooperate to indicate the extent or degree of correction applied.

This invention possesses many other advantages and has other objects which may be made more easily apparent from a consideration of several embodiments of the invention. For this purpose there are shown a few forms in the drawings accompanying and forming part of the present specification. These forms, which illustrate the general principles of the invention, will now be described in detail; but it is to be understood that this detailed description is not to be taken in a limiting sense, since the scope of the invention is best defined by the appended claims.

In the drawings:

Figure 1 is a front view of an indicator device embodying the invention;

Fig. 2 is a fragmentary view of the indicator of Fig. 1, but in a different position;

Fig. 3 is a detail view on an enlarged scale of the pointer of Fig. 1;

Fig. 4 is a detail sectional view on an enlarged scale as seen on plane 4—4 of Fig. 1;

Fig. 5 is a view similar to Fig. 1, showing a modified form of the invention;

Fig. 6 is a front view of a further modification of the invention;

Figs. 7 and 8 are fragmentary views of the indicator of Fig. 6, showing different positions of the scale and pointer;

Figs. 9, 10 and 11 are diagrams utilized in explaining the manner in which the calibration process may be effected;

Fig. 12 is a front view of a further modification of the invention; and

Figs. 13 and 14 are fragmentary views of the indicator of Fig. 12, showing different positions of the scale and pointer.

In order to explain the problems that arise in connection with calibration, attention is directed to Figs. 9, 10 and 11. In this instance a scale 48 is shown, with which cooperates a pointer index 49. The scale for the sake of simplicity, is shown of linear form, and either the scale or the pointer may be moved in accordance with the quantity measured or indicated. The scale 48 is arbitrarily shown as having a maximum indication of 100 units—as of time, volume, temperature, weight or other measurable quantity. The scale may be movable say toward the left as the indicator operates.

Across the width of the scale, there extend the scale marks 50. The scale is purposely made rather wide, so that the transverse path of the pointer index 49 may be adjusted to correspond to any path extending along the length of scale 48 and parallel to the indicating motion. Accordingly, the lines 50 may be so drawn that the indications are a function of this transverse path. For example, in the form shown in Figs. 9, 10 and 11, the middle line 51, corresponding to an indication of half the maximum, is shown as truly normal to the path of indicating travel; but the lines 50 on either side are drawn so as to converge upwardly upon a point on the extension of line 51. Accordingly, the farther the pointer mark 49 is from the lower edge of scale 48, the greater the readings are for equal indicating movements.

By appropriate choice of the configuration of each of the lines 50, however, the variations in reading for any extent of indicating motion may be predetermined. If for example, all of the scale lines 50 converge to a common point, it is easy to demonstrate, by elementary geometry, that the correction factor along any transverse path, would be constant for all scale readings. For example, the four longitudinal lines 52 may be marked on the scale and separated sufficiently to correspond to increments in the correction factor by one percent. In other words, the reading when taken at the top edge of scale 48 would be always five percent greater than the reading would have been on the lower edge for the same indicating movement. However, the lines 50 may if required be curved or broken or have non-converging inclinations so as to provide different corrections at different portions of the scale. The example illustrated is merely chosen for the sake of simplicity.

It is also unnecessary to provide a truly normal line 51 at a central portion of the scale; but it is convenient to do so, for in that manner, even the extreme mark, corresponding to the maximum indication, would not have a steep inclination to the normal direction. Thus in the example chosen the zero line 53 and the maximum indicating line 54 are equally and oppositely inclined, toward the normal line 51.

We are now ready to describe the calibrating steps. The indicator is rendered operative, to indicate a definite accurately predetermined quantity, corresponding to the normal line indication 51; in this instance, this quantity may be fifty amperes, or fifty volts, or fifty gallons, or fifty pounds, or fifty minutes, etc. Let us assume that the scale however moves to the position of Fig. 9, showing a plus error. The first step is to adjust the pointer 49 or the scale 48 while the indicator still responds to the amount to be measured so as to bring the pointer to the correct indication. This step is shown in Fig. 10, and is accomplished by moving the scale or pointer in a direction corresponding to the indicating movement, and as permitted by the adjustable supports 55. Then the indicator is released to enable it to return to the zero position. This returned position is shown in Fig. 11. Then lastly the pointer 49 must be adjusted transversely to bring it accurately to the zero line 53, as shown in the dotted line position at the left of Fig. 11. It is thus seen that two adjusting acts must be performed in this method; one to bring the normal line 51 and the index 49 together; and then a transverse movement after a return of the indicator to zero, to bring the index 49 onto the zero line 53.

By the aid of the present invention, but one calibrating adjustment is necessary.

In the form of the invention illustrated in Figs. 1 and 2, a scale member or dial 1 is shown as of arcuate form and as being the moving member of the indicator mechanism. The dial 1 is supported for angular movement about its center 2, being suitably secured to a rotary element of the metering or other measuring mechanism as by screws 3. Dial 1 carries an arcuate scale 4 concentric about the center 2; this scale may extend for nearly the entire circumference of the dial as shown, or may extend for only a limited portion thereof. A pointer 5 is supported so as to be stationary with respect to the dial 1, as for example by means of the indicator housing 6. Pointer 5 carries a suitable index mark 7 to cooperate with scale 4.

The indicia of scale 4 consists of a plurality of scale marks or lines 8 arranged generally in a direction transverse to the direction of relative motion between the scale and the pointer 5. The scale marks 8 are shown as being provided with readings 9 arranged at the inner arc boundary of the marks 8. Arrangements are provided so that the index 7 may be caused to traverse the scale 4, at any desired place between the inner and outer boundaries of the scale 4. By varying the angular spacing between the inner and the outer ends of marks 8, it is possible to obtain various scale readings corresponding to a given angular movement of the dial, by adjusting the radial position of the pointer. Thus, in the dial 1, the inner ends of marks 8 are spaced apart uniformly, but are angularly farther apart than are the outer ends of marks 8. With pointer 5 in the position shown, a given angular movement of dial 1 will give a greater scale reading than if the pointer were nearer the outer end of the marks. In this way, it is possible to bring the scale reading into close harmony with the actual measurement of the metering or other measuring apparatus with which it is connected. By arranging that a transverse arcuate path midway between the arcs defining the inner and outer ends of marks 8 corresponds to a normal operation of the measuring apparatus, adjustment of pointer 5 inwardly from this line toward center 2 of the dial will serve to correct for measuring apparatus which is running above normal, while moving the pointer outwardly from this line will compensate for measuring apparatus which is less than normal.

Brief consideration will show that the greater the angular difference in the spacing between the outer ends and the inner ends of scale marks 8, the greater will be the range of variation obtainable by adjustment of pointer 5. At the same time, it is desirable to avoid too great an inclination of the scale marks 8 with respect to a radial line, as such inclination makes accurate reading of the scale difficult.

The pointer 5 is mounted so that the index 7, when it is adjusted, moves always to stay on the zero line 11, at the zero position of the dial 4. As will be hereinafter explained, this makes it unnecessary to adjust the angular position of the dial on its movable support.

One manner in which the pointer may be thus adjusted is shown in Figs. 1 and 2. Therein pointer 5 has a lower arcuate portion 14 positioned in proximity to the scale 4 and carrying the index 7 with which the zero mark 11 on the scale coincides for the zero position of the dial. Extending upwardly from the portion 14 is a inclined shank 15 which is slidably mounted in a groove 16 on the housing 6. Shank 15 is provided with a central slot 17, through which a screw 18 extends, threadedly engaging the housing. A washer 19 is provided under the head of screw 18. By tightening screw 18, the pointer is held against movement. If the screw is loosened, the pointer may be shifted in groove 16. Since groove 16 has the same inclination as the mark 11, the index 7 will always be in alinement with the mark for zero position of the dial.

The adjustment of the pointer to bring the scale readings into harmony with the quantities measured by the measuring apparatus is very simple. The measuring apparatus is actuated until the maximum quantity which the scale is graduated for, or even a lesser quantity, has been delivered as determined by independent measuring means. This may bring scale mark 14 into the position of Fig. 2, where it is shown for illustrative purposes as failing to register with the index 7, showing that the dial has moved less than the angle required for accurate indication for the particular transverse path chosen. The pointer 5 is then adjusted in groove 16 to bring the index 7 into registry with scale mark 14. Due to its inclined mounting it will still register with the zero mark 11 when the dial returns to the zero position, and it will also give a correct reading at any intermediate point.

By providing some means to indicate the position of the path chosen for the relative traversing movement of the scale and pointer with respect to the path along which the scale indications agree with the actual measurements of the associated metering apparatus, and suitably corelating this means with the difference between the angular spacing of the inner ends and the outer ends of scale marks 8, it is possible to observe the extent of the correction applied or to apply a correction of known amount to the scale reading.

Thus, as clearly shown in Fig. 3, the housing 6 adjacent one side of the groove 16 is provided with indicia 60 while the pointer 5 carries a cooperating index mark or finger 61. The scale 60 may conveniently have a zero point so positioned that when index mark 61 is alined with it, the indicated quantity will agree with the quantity actually measured by the associated metering apparatus. The zero mark may be at some point when the path of travel between the scale and pointer will be intermediate the extremities of scale marks 8, as at the middle of marks 8 for instance, in which case plus or minus corrections can be applied, all as shown. Or the zero mark may be positioned so that the pointer when having a zero correction will be alined with either extremity of scale marks 8 in which case the applied correction will be all plus or all minus as the case may be. The proportion which the angular length of any chosen path bears to the angular length of the path of zero correction is the same as the proportion which the quantity actually measured by the meter when the indication is along this path to the quantity measured when the indication is along the zero path. Thus scale 60 can be readily graduated to indicate the percentage of correction.

In Figs. 1 and 3, when pointer 5 is set for zero correction, corresponding to a path traversing the midpoints of scale marks 8, the angular length of this path is approximately 315°. If a correction of plus and minus 5 percent is desired, then the angular length of the inside or longer path is increased by 5 percent of this amount. That is, its length is 315°+(.05×315) or 330.75°. Similarly, the angular length of the outside or longer path is 5 percent less than 315° or 299.25°. However, in Fig. 1, the lengths of the extreme inside and outside paths are approximately seven degrees more and less respectively than the length of the middle path, thus a range of correction slightly greater than 4 percent is obtainable. The beginning mark of scale 4 may be given some convenient inclination, as for example 60°, as shown.

It will be understood that a scale of this type is equally suitable for a stationary dial and moving pointer, and the dial may be made adjustable with respect to the pointer. Such an arrangement is shown in Fig. 5. Therein, the scale 20 includes scale markings 21, the spacing between the upper extremities of the marks being different from that between the lower extremities, in a manner analagous to the scale of Fig. 1. In this case, an intermediate path 62 is marked on the scale as being for zero correction, the lengths of the paths 63 and 64 along the upper and lower extremities of the scale marks 21 being five percent less and five percent greater respectively than the length of the zero path 62.

Appropriate indicia 64' may be provided at one or both ends of the scale, to indicate the amount of correction. The beginning or zero mark 22 may be given an inclination of 60 degrees, as in Fig. 1, the end or maximum mark 23 having an inclination to suit the lengths of paths 63, 64. However, it may be preferable, to have the beginning and end marks 22, 23, inclined by equal and opposite amounts as shown in Fig. 5, whereby the degree of inclination of these marks with respect to the pointer is kept as small as possible.

The moving pointer 24 carries an index or finger 25 adapted to traverse scale 20 in the direction of paths 62, 63, 64. The pointer is not adjustable to alter its path of travel as in the first form, but the scale 20 is arranged to be adjusted with respect to the pointer, and preferably in the direction of the beginning scale mark 22. Thus, slots 65 are provided at opposite ends of scale 20, these slots being parallel to mark 22. A screw 66 passes through each of slots 65 and serves to attach scale 20 to a support 67 and clamp it in adjusted position. It will be plain that by loosening screws 66, scale 20 may be slid along the screws in the direction of mark 22, to bring any desired path of travel in line with the pointer index 25. The screws 66 are then tightened and scale 20 is held in adjusted position. The calibrating is done as before, that is, index 25 need only be brought to the correct scale graduation at any measuring point.

Fig. 6 shows a form of the invention embodying an adjustable dial, as well as a moving and a fixed pointer. Such an arrangement is useful where it is desired to set the dial to some predetermined quantity; and the traverse of the moving pointer between zero and the set quantity sets in motion a sequence of events at the conclusion of the traverse; as for example, to cause a termination in the delivery of the measured quantity. As an example of this, a batch delivery system may be cited. It is to be understood that the batch may be determined by weight, volume, or time, the batch being delivered as the pointer traverses the scale between zero and the set quantity. At the completion of the cycle, the pointer returns to its initial position, ready for a succeeding cycle. An example of such an arrangement is shown and described in a copending application, filed December 27, 1938, Ser. No. 247,966, and entitled "Measuring device for liquids," in the names of Francis W. Guibert and Frederic B. Fuller.

In this form of the invention, the dial 30 may be considered as a stationary dial, with which cooperates an angularly movable pointer structure 40. This pointer structure 40 is shown as pivoted at the center of the circular dial and movable from the zero indicating position of Fig. 6 in a clockwise direction to traverse the scale marks 31. As in the form illustrated in Figs. 1 and 2, these scale marks are so arranged that the end marks 37 and 57 are inclined in opposite directions.

The pointer structure 40 includes an index finger 41 having an indicating point. The term indicating point is not to be construed as limited to the extremity of a pointer such as shown in Fig. 6, but may be any well known means for indicating a point, for example, such as that shown in Fig. 1, or a reticule. This index finger 41 may be adjustable in the direction of the zero scale mark 37, as by the aid of a channel guide 42 incorporated in the pointer structure 40. A screw 43 is provided for maintaining the adjustment of the index finger.

In the present instance the mechanism is such that the pointer structure 40 has a definite stop in the zero position. This stop is indicated diagrammatically by the pin 58 of Fig. 6, shown as in the path of the pointer structure, and as serving to stop the pointer with respect to the dial in the zero position. Although the stop pin 58 is shown as attached to the upper face of the dial 30, in the actual embodiment such as illustrated in the prior application referred to above, this stop may take other forms.

The arrangement may be such that upon the arrival of the pointer structure 40 to a predetermined point along the dial 30, certain automatic actions are effected, such as the making or breaking of a circuit, or opening or closing a valve or the like. The dial is shown in this instance as graduated in gallons of delivery of a liquid such as water, and the arrangement is for stopping the delivery of liquid after a definite number of gallons is delivered.

The position of the pointer structure 40 where the automatic actions take place, is indicated in Figs. 7 and 8. The adjustment of the amount of delivery in gallons is provided for by angularly adjusting the dial 30, so that the angular traverse from the zero point of the dial to this fixed position of Figs. 7 and 8 is varied. The starting point of the cycle is always from the zero point of the dial, the stop pin 58 ensuring that the pointer structure 40 will always start from this position.

For the dial adjustment, there is diagrammatically illustrated a worm 46 meshing with a worm wheel 45 arranged to rotate the dial support. The worm 46 is indicated as rotatable by handle structure 47. It is apparent that the farther the dial structure is adjusted in a counterclockwise direction, the larger the indication must be before the automatic actions take place. After the automatic functions are initiated, appropriate mechanism is provided for causing the return of the pointer structure to the starting position of Fig. 6, in preparation for a succeeding cycle of delivery and indication.

The manner of calibration is entirely similar to that discussed in connection with the form of the invention illustrated in Figs. 1, 2 and 3. For this purpose the apparatus is caused to deliver a predetermined measured quantity of the liquid; for example, the maximum delivery of 120 gallons. For this calibrating function the dial 30 is rotated to such a point by trial as to cause the delivery of exactly 120 gallons before the pointer structure 40 reaches the position of Fig. 8 and thereafter returned to the zero position of the scale. We will assume that for this quantity of liquid delivered, the pointer structure 40 falls off of the maximum dial mark 57, as indicated in Fig. 8. To calibrate the device all that is necessary to do is at this point to adjust the pointer 41 in the channel 42 so as to bring the pointer 41 exactly to the scale mark 57. This adjustment does not in any way interfere with the accurate registry of the pointer structure with the zero mark 37, when the pointer structure is returned to starting position.

It is convenient to make it possible to indicate the quantity for which the dial mechanism is set for this automatic operation. For this purpose, another pointer structure is utilized, which may be stationary and which cooperates with the scale marks 31. Thus the stationary pointer 32 cooperates with the dial 30 to indicate on the dial the quantity to be measured in any one cycle. This pointer carries an index mark 33 and is adjustable in an inclined slot 34 in the case 35. The screw 36 serves to hold this pointer in adjusted position. The inclination of the slot 34 coincides with the inclination of the pointer 41 when it is in the position of initiating the automatic action as indicated in Figs. 7 and 8, as well as with the inclination of the beginning scale mark 37. At the conclusion of the process of calibration as just described, and after the pointer structure 40 has been adjusted to coincide with the chosen calibrating mark (such as 57), the pointer structure 32 is also moved to coincide with the indicating point of the pointer structure 41 in that position.

Thereafter the dial 30 may be set to deliver any amount between zero and the maximum amount, and this setting will be accurately indicated by the mark 33 on the dial 30.

The cycle of operation of the mechanism may be summarized. After the dial 30 is adjusted to indicate the desired delivery by the aid of the mark 33, the mechanism may be started. The pointer structure 40 moves from its zero position of Fig. 6 to the termination position of Fig. 8. At all times this moving pointer structure 40 indicates the amount of liquid that has actually been delivered. When the pointer structure 40 coincides with the index 33, the delivery is terminated, and the pointer structure 40 is automatically returned against the stop 58 for the beginning of a new cycle of delivery.

As in the first form of the invention, the stationary pointer 32 and the adjacent edge of slot 34 are provided with means to indicate the variation of the measured quantity from that indicated. Thus, pointer 32 has a scale 70, which is shown as being graduated from five percent plus through zero to five percent minus, a cooperating index or finger 71 being provided on casing 35. Thus, a range of adjustment of ten percent is provided.

The range of adjustment need not be restricted to this amount, since by providing a greater inclination of the scale marks, or a wider scale, or a combination of both, a much greater range can be readily provided.

With a wider scale, the inclination of the graduation required for a given range is less, and more accurate reading is possible. However, with a wide scale on a curved member or dial it is preferable that the scale lines be curved, as shown in Fig. 6, for greater accuracy. The beginning or zero line of the scale as 37 is preferably straight and may be inclined at a desired angle as before. The other lines should be preferably portions of Archimedes spirals, although with a scale of moderate width as shown in Fig. 6, these lines may be arcs of circles. With a straight scale, as shown in Fig. 5, the scale lines will be straight.

The pointer structure 40 having an index finger 41 adjustable in the direction of the beginning scale mark 37, as shown in Figs. 6, 7 and 8 may, of course, be used with a scale, as 30 without the stationary pointer 32. Either the scale 30, or the pointer structure 40, may be the moving member, the inclination of finger 41 permitting calibration of the scale readings in the manner previously set forth.

When a stationary pointer, such as 32, which is adjustable in the direction of the beginning scale mark, is used, however, a simpler form of moving pointer may be used. Thus, in Fig. 12, a movable dial 30 is provided as before having inclined scale marks 31, the beginning mark 37 being straight. The pointer 32 carries an index 33 and is slidable in slot 34, the slot 34 having the same inclination as mark 37 when the dial is in beginning position. The moving pointer 75 is shown as formed of a single piece having a slot 76 at its inner end. Pointer 75 is secured to shaft 77, which is driven by the metering mechanism as before, by means of a screw 78 and washer 79. By loosening screw 78, pointer 75 may be adjusted angularly as well as radially with respect to shaft 75.

As in calibrating the form shown in Fig. 6, the dial is adjusted until the metering apparatus is caused to deliver some definite measured quantity, preferably the amount of the maximum reading on the dial, as for example 120 gallons. The 120-mark, 57, on the scale may then not be in alinement with the index 33, and the moving pointer 75 may not aline with either index 33 or scale mark 57. Screw 36 is then loosened and pointer 32 is moved in slot 34 until index 33 is in alinement with mark 57, after which the screw is tightened. Then screw 78 is loosened and pointer 75 is brought into registry with mark 57 and index 33, after which screw 78 is tightened, bringing the pointer into the relationship shown in Fig. 14. Pointer 75 will always return to the beginning mark 31 after such adjustment, and will correctly indicate any quantity passing the metering element.

Brief consideration will show that the angular movement of shaft 77 is a function of the quantity passing the metering element, and the adjustment of pointer 32 brings the angular indication by this element on scale 30 into agreement with this movement. Hence, if pointer 75 is alined with index 33 of pointer 32, the angular movement of the pointer which is the same as that of shaft 77 will be the same as the angular extent of the chosen path on the scale, and the pointer will always return to the beginning mark. Thus, any type of adjustment for pointer 75 which makes it possible to bring the pointer into alinement with index 33 may be used.

What is claimed is:

1. In an indicating mechanism, including relatively movable scale and pointer members, the scale member having graduation marks with which the pointer member cooperates to give a reading, said scale marks extending transversely of the path of relative movement between the members, said marks being inclined with respect to said path at progressively different angles, means to adjust said members relative to each other to alter the position of said path with respect to said marks, whereby to vary the reading for a given amount of said relative movement, said means including a guide for one of said members for guiding said adjustment in the direction of one of said scale marks, and means to indicate the amount of said adjustment.

2. In an indicating mechanism, including relatively movable scale and pointer members, the scale member having graduation marks with which the pointer member cooperates to give a reading, said scale marks extending transversely of the path of relative movement between the members, said marks being inclined with respect to said path at progressively different angles, means to adjust said members relative to each other to alter the position of said path with respect to said marks, whereby to vary the reading for a given amount of said relative movement, said means including a guide for one of said members for guiding said adjustment in the direction of one of said scale marks, and means to indicate the amount of said adjustment, said last mentioned means including cooperating index and indicia on said guide and said one member.

3. In an indicating mechanism including relatively movable scale and pointer members, the scale member having graduation marks with which the pointer member cooperates to give a reading, said scale marks extending transversely of the path of relative movement between the members and being so arranged that for a given amount of relative movement the reading varies with the position of said path with respect to said marks, the beginning mark of the scale being inclined with respect to said path, means to relatively adjust said members to alter the position of said path, means to cause said relative adjustment to be in the direction of said beginning mark, and means to indicate the amount of said adjustment.

4. In an indicating mechanism, including relatively movable scale and pointer members, the scale member having graduation marks with which the pointer member cooperates to give a reading, said scale marks extending transversely of the path of relative movement between the members, said marks being inclined with respect to said path at progressively different angles, whereby the length of said path of travel varies in accordance with its position with respect to the scale marks, means to adjust said members relative to each other to alter the position of said path with respect to said marks whereby to vary the reading for a given amount of said relative movement, said means including a guide for one of said members for guiding said adjustment in the direction of one of said scale marks, said guide and said one member forming relatively adjustable members, an index and scale carried respectively by said adjustable members to indicate the amount of said adjustment, said last mentioned scale being graduated in accordance with the variation in the length of the chosen path of travel.

5. In an indicating mechanism adapted to be compensated for accurate calibration, a scale member, a pointer member having an indicating point, one of said members being movable in accordance with a quantity to be indicated in an indicating direction so as to give a reading directly between said point and the scale, said scale member having a series of scale lines extending transversely to the path of said movement, successive scale lines having different inclinations with respect to said path, and means for adjusting one of said members so as to cause the indicating point of said pointer member to cooperate with the scale lines along any desired path transverse to said lines, said path determining the degree of correction applied to the reading, said means including a graduated device for indicating the degree of correction, as well as a mark cooperating with the indicating point of said pointer member for facilitating the desired setting.

6. In an indicating mechanism adapted to be compensated for accurate calibration, a scale member, a pointer member having an indicating point, one of said members being movable in accordance with a quantity to be indicated in an indicating direction so as to give a reading directly between said point and the scale, said scale member having a series of scale lines extending transversely to the path of said movement, successive scale lines having different inclinations with respect to said path, and means for adjusting one of said members so as to cause the indicating point of said pointer member to cooperate with the scale lines along any desired path transverse to said lines, said path determining the degree of correction applied to the reading, said means comprising an adjustable pointer setter having an index adapted to cooperate with the indicating point of said pointer member to facilitate the compensating adjustment of the scale and pointer members, and graduations cooperating with said setter, for determining the correction to be applied.

7. In an indicating mechanism having a relatively movable scale and pointer, the scale having division marks, and the pointer, in performing its indicating operation, traversing a path transverse to the division marks, said marks being so formed that successive marks have different inclinations with respect to said path, whereby the scale readings are a function of the particular transverse path, and corrected readings accurately conforming to the indicated quantities may be secured, the beginning division mark deviating from a direction normal to the relative indicating movement between the pointer and the scale, and means for making a compensating adjustment between the pointer and the scale in a direction corresponding to the direction that maintains said pointer and the beginning division mark in coincidence when the pointer and scale are in beginning position, including graduations determining the correction to be applied.

FRANCIS W. GUIBERT.
FREDERIC B. FULLER.